United States Patent

Shaltz et al.

[11] 3,975,273
[45] Aug. 17, 1976

[54] TWO-STAGE FLUID FILTER

[75] Inventors: Gregory P. Shaltz; Joaquin P. Armas, both of Longmont, Colo.

[73] Assignee: Parma Industries, Inc., Longmont, Colo.

[22] Filed: Aug. 29, 1974

[21] Appl. No.: 501,654

[52] U.S. Cl. .................................. 210/74; 210/314; 210/318; 210/440; 210/443; 210/DIG. 17
[51] Int. Cl.$^2$ .......................................... B01D 37/04
[58] Field of Search ............. 210/74, 314, 316, 318, 210/440, 443, 452, 494, DIG. 13, DIG. 17, 73 W; 184/6.24

[56] References Cited
UNITED STATES PATENTS

| | | | |
|---|---|---|---|
| 2,098,725 | 11/1937 | Hurn | 210/168 X |
| 2,599,604 | 6/1952 | Bauer et al. | 210/494 |
| 2,868,383 | 1/1959 | Nicolls | 210/440 X |
| 3,586,171 | 6/1971 | Offer | 210/314 X |
| 3,722,696 | 3/1973 | Dwyer et al. | 210/494 X |
| 3,759,391 | 9/1973 | Dreher | 210/494 |

FOREIGN PATENTS OR APPLICATIONS

| | | | |
|---|---|---|---|
| 953,418 | 3/1964 | United Kingdom | 210/DIG. 13 |

*Primary Examiner*—Charles N. Hart
*Assistant Examiner*—Robert G. Mukai
*Attorney, Agent, or Firm*—Leydig, Voit, Osann, Mayer & Holt, Ltd.

[57] ABSTRACT

A two-stage fluid filter such as an automotive oil filter. The two-stages of filtering media are mounted inside a conventional cylindrical housing forming fluid inlet and outlet ports in one end thereof. One stage of the filtering media comprises an annular depth type filtering medium having a radially outer surface in fluid communication with the inlet port, and a radially inner surface in fluid communication with the outlet port so that fluid can flow from the inlet port to the outlet port by flowing radially through the depth type medium. The second stage of the filtering media comprises a spirally wound surface type filtering medium, such as filter paper, with alternate pairs of opposed surfaces of the spiral winding bonded to each other along the circumferential edges at one longitudinal end of the spiral winding. The intervening pairs of opposed surfaces in the spiral winding are bonded to each other along the circumferential edges at the other longitudinal end of the spiral winding, so that the spaces between the intervening pairs of opposed surfaces are open at one longitudinal end and spaces between the alternate pairs of opposed surfaces are open at the other longitudinal end. The spiral winding has one longitudinal end in fluid communication with the inlet port and the other longitudinal end in fluid communication with the outlet port so that fluid can flow from the inlet port to the outlet port by flowing axially through the spiral winding. The filter paper used to form the spiral winding is preferably of a lighter weight and lower porosity than the paper conventionally used in oil filters, and provides a larger surface area in the spiral winding, although the spiral winding occupies no greater volume than a conventional pleated paper filter element.

14 Claims, 5 Drawing Figures

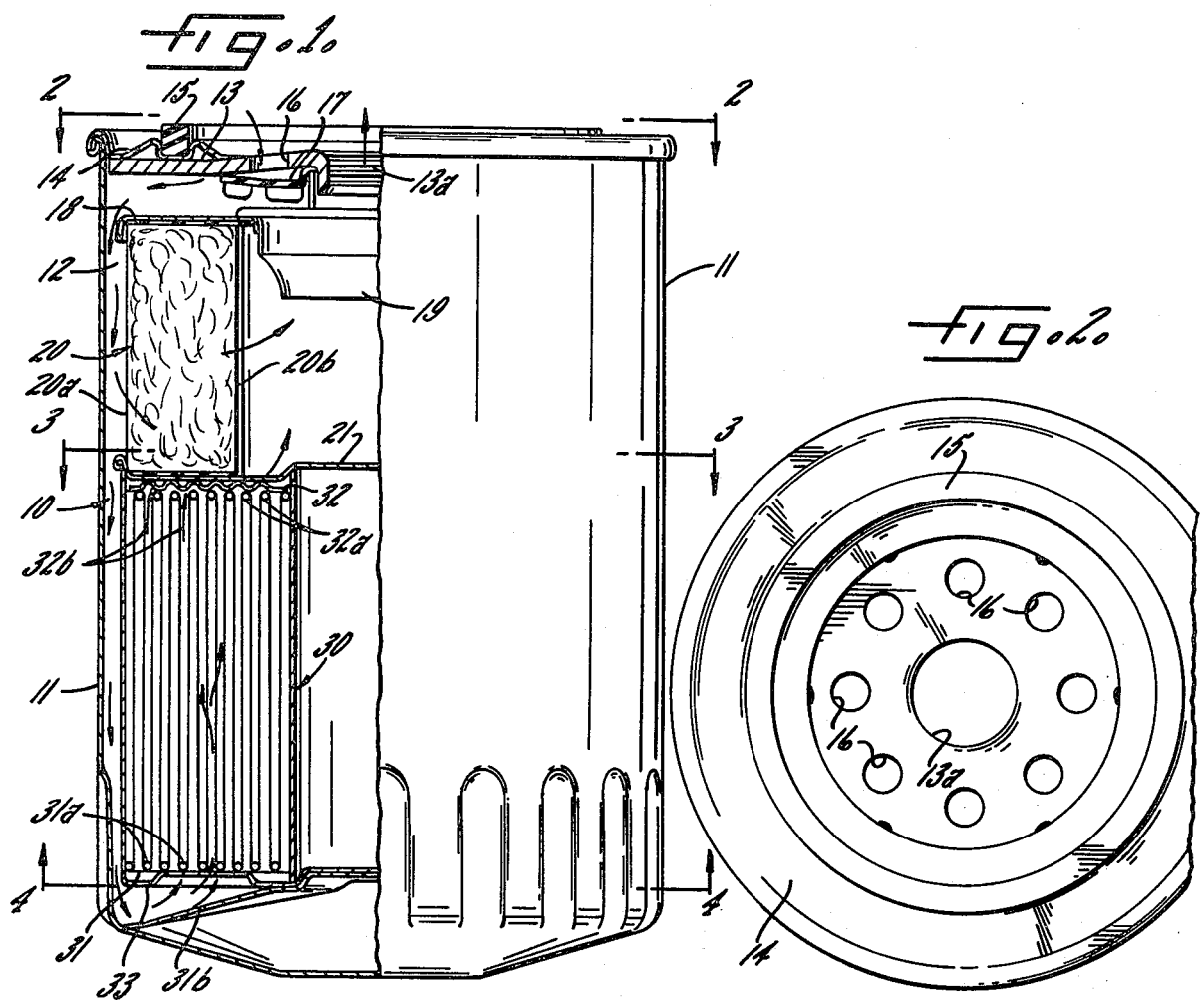

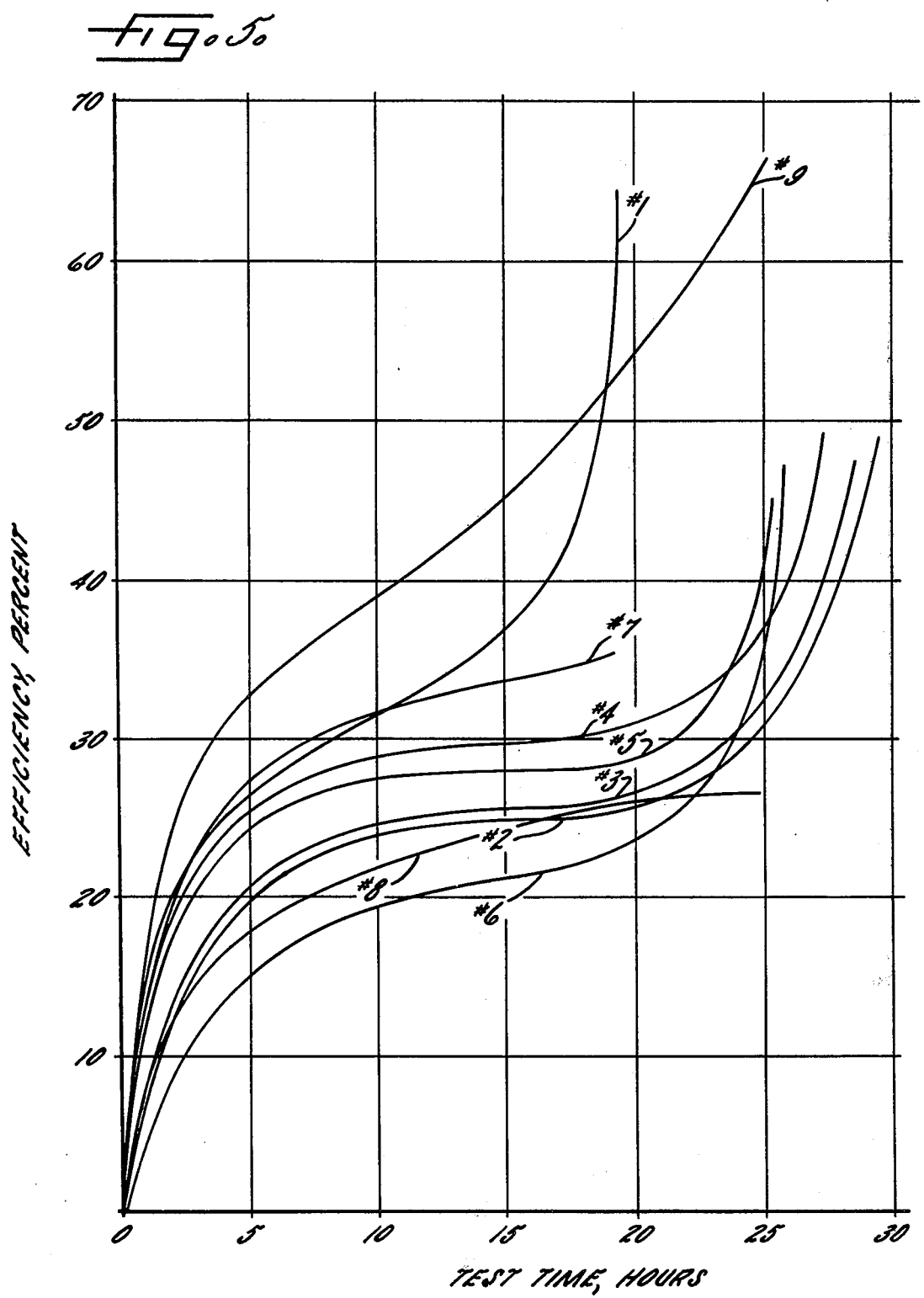

TWO-STAGE FLUID FILTER

DESCRIPTION OF THE INVENTION

The present invention relates generally to fluid filters such as automotive oil filters, and more particularly, to an improved two-stage filter.

It is a primary object of the present invention to provide an improved two-stage fluid filter that produces significantly improved efficiencies without any substantial reduction in operating life (as compared with present commercial filters).

It is another important object of the invention to provide an improved two-stage fluid filter of the foregoing type which can be efficiently manufactured at a cost that is competitive with that of most automotive oil filters being manufactured today. In this connection, a related object of the invention is to provide such an improved fluid filter which uses relatively inexpensive materials.

A further object of the invention is to provide such an improved two-stage fluid filter which can be mass produced at high production rates, and which can be reliably reproduced.

Other objects and advantages of the invention will be apparent from the following detailed description and the accompanyings, in which:

FIG. 1 is a longitudinal cross section of an automotive oil filter embodying the invention;

FIG. 2 is a full plan view of the upper end of the filter as shown in FIG. 1;

FIG. 3 is a full section taken along line 3—3 in FIG. 1;

FIG. 4 is a full section taken along line 4—4 in FIG. 1; and

FIG. 5 is a series of graphs showing the results of comparative tests conducted on the filter of FIG. 1 and a number of conventional and commercially available automotive oil filters.

While the invention will be described in connection with a certain preferred embodiment, it will be understood that it is not intended to limit the invention to that embodiment. On the contrary, it is intended to cover all alternatives, modifications, and equivalents as may be included within the spirit and scope of the invention as defined by the appended claims.

Turning now to the drawings and referring first to FIGS. 1–4, the invention is illustrated in a filter unit of the type used to filter the oil in an internal combustion engine in an automobile, for example. The filter assembly includes a two-stage filter cartridge 10 which is supported coaxially within a conventional cylindrical housing 11 whose side walls are spaced away from the outer periphery of the cartridge 10 so as to form an elongated annular passageway 12 through which the oil is distributed to the filtering media in the cartridge 10. As the oil passes through the filtering media, dirt and other particulate matter is removed, and the cleansed oil is discharged from the filter unit through an outlet 13a formed in the center of a screw plate 13 which is internally threaded for mounting the filter unit on a suitable fitting leading to the oil circulation system in the engine. To hold the screw plate captive on the housing 11 of the filter unit, and end ring 14 secured to the housing 11 around its outer periphery covers the outer portion of the plate 13. This end ring 14 is typically welded to the screw plate 13 as at 14a to prevent the plate 13 from rotating within the housing 11 during mounting. When the filter unit is mounted on an engine, a gasket 15 held in a circumferential groove in the ring 14 is pressed against an opposed seating surface on the engine to provide a tight fluid seal at the interface between the filter unit and the surface on which it is mounted.

The inlet to the filter unit comprises a circular array of ports 16 formed in the screw plate 13 in the area between the gasket 15 and the threaded aperture 13a in the center of the plate 13. Oil pressure on the outer surface of the plate 13 is applied through the ports 16 to an anti-drain valve 17 which is biased by its inherent resiliency against the inner surface of the plate 13 to prevent oil from draining out of the filter unit when it is not in use. When the filter is in use, the oil pressure moves the valve 17 away from the plate 13 against its bias, thereby admitting oil into the interior of the housing 11 along the flow path indicated by the arrows in FIG. 1. As oil enters the cavity between the plate 13 and an end cap 18 on the filter cartridge 10, the oil normally flows around the outer periphery of the cap 18 into the passageway 12, and on into the filtering media in the cartridge 10. The end cap 18 completely covers the end of the cartridge 10 to block the entry of oil into that end of the cartridge.

As the filtering media in the cartridge 10 become clogged with dirt and other particulate matter removed from the oil, the efficiency of the filter diminishes until it reaches a point at which it is more desirable to bypass the filtering media than to continue to attempt to pass the oil therethrough. Consequently, a bypass valve 19 is mounted between the inlet ports 16 and the outlet port 13a for conducting the oil directly from the inlet to the outlet of the filter unit, bypassing the filtering media in the cartridge 10, in response to an increase in the oil pressure to a predetermined level at the inlet. That is, the clogging of the filtering media is reflected by increasing oil pressure on the upstream side of the filter cartridge 10, and this pressure is used to actuate the bypass valve 19. In the illustrated filter, the bypass valve 19 is a conventional bypass valve unit for automatic oil filters. This unit has a circular array of holes facing the screw plate 13 with an internal spring urging a movable valve member toward the holes so as to block the flow of oil therethrough. When the oil pressure at the inlet of the filter increases above the predetermined level, the oil pressure overcomes the biasing force of the internal spring and retracts the movable valve member to open the holes in the unit 19 so that oil can flow directly from the inlet ports 16 to the outlet port 13a through a center hole in the bypass valve 19, thereby bypassing the filter cartridge 10.

In accordance with one important aspect of the present invention, a two-stage filter cartridge 10 has one stage comprising an annular depth type filtering medium, and a second stage comprising a spirally wound surface type filtering medium with alternate pairs of opposed surfaces of the spiral winding bonded to each other along the circumferential edges thereof at one longitudinal end of the spiral winding. The intervening pairs of opposed surfaces of the spiral winding are bonded to each other along the circumferential edges thereof at the other longitudinal end of the spiral winding, so that the spaces between the intervening pairs of opposed surfaces are open at one end of the winding and the spaces between the alternate pairs of opposed surfaces are open at the other end of the winding. This spiral winding is encased in such a manner that oil enters one longitudinal end of the winding and exits from the other end, passing through one or more layers of the filtering medium in the course of passing from one end to the other. As used herein, the term "depth type filtering medium" refers to a medium which traps solid particles throughout its thickness, not only on its surface, and the term "surface type filtering medium" refers to a medium which traps solid particles only on its surface. In general, a fresh depth type medium passes larger solid particles than a fresh surface type medium, and has a higher fluid flow-through rate, a lower efficiency, a longer life, and a considerably greater thickness than the suface type medium.

In the illustrative embodiment, the depth type filtering medium comprises a molded annulus 20 consisting of rayon fibers and a binder. One longitudinal end of the annulus 20 is bonded to the end cap 18, and the other end is bonded to an annular retainer plate 21. Consequently, the radially outer surface 20a of the annulus 20 is in fluid communication with the inlet ports 16 via the passageway 12, and the inner surface 20b of the annulus 20 is in fluid communication with the outlet port 13a through the central hole in the bypass valve unit 19, so that oil can flow from the inlet port to the outlet port by passing radially through the depth type filtering medium. The resin in the depth type element 20 coats the rayon fibers and holds them in a substantially rigid matrix having a predetermined porosity so that it removes all solid particles above a predetermined size, e.g., above 90 microns. Depth type filtering elements of this type are typically high flow rate and relatively low efficiency elements which are commercially available, such as the rayon "Donut" (part No. B-34000) made by GAF Corporation, New York, New York.

The spirally wound filter element in the illustrative device comprises a spiral winding 30 of two co-extensive strips of a surface type filtering medium such as creped filter paper. These two strips of filter paper are continuous throughout the spiral winding, and at the entrance end 31 the two strips have alternate pairs of opposed internal surfaces of the spiral winding bonded together by a suitable adhesive along the longitudinal edges thereof, as at 31a, so that only the spaces (indicated by arrows 31b) between the intervening pairs of opposed surfaces are open at that end of the spirally wound element 30. At the outlet end 32 of the element, only the intervening pairs of opposed surfaces of the longitudinal strips are adhesively bonded together, as at 32a, so that the oil must exit through the open spaces (indicated by arrows 32b) between the alternate pairs of opposed surfaces. Consequently, it can be seen that the oil must flow through at least one layer of the filter paper between the entrance and exit ends 31 and 32 of the spirally wound element 30 as the oil flows axially therethrough.

In order to hold the spirally wound filter element in place within the housing 11, it is held captive between an end cap 33 at the inlet end 31 and the retainer plate 21 at the outlet end 32. The end cap 33, which seals the center opening in the element 30, is held in place by a support plate 3 which registers with an indented central area in the cap 33 to hold the element 30 in the desired radial and axial position. To permit oil to enter the spirally wound element 30 from the passageway 12, the end cap 33 forms an annular array of apertures 33a. At the exit end of the element 30, a similar annular array of apertures permit oil to exit from the spiral winding into the central opening of the element 20, as indicated by the arrow 31b. From there the oil flows through the center of the bypass valve unit 19 into the outlet port 13a. An apertured spacer holds the exit end of the spiral winding 30 away from the plate 21 so that oil exiting from the outer portion of the winding 30 can flow freely into the apertures.

The spirally wound filter element 30 is a low flow rate, high efficiency element that removes solid particles considerably smaller than those removed by the high flow element 20. The filter paper used in the spirally wound element has a lower basis weight and lower porosity than most papers previously used in oil filters. That is, it is lighter, thinner and denser than conventional oil filter papers. The use of this paper in a spiral winding also provides a greater surface area than conventional paper elements used in oil filters heretofore, although is occupies the same volume as a conventional pleated paper element of the same axial dimension. These characteristics generally would be expected to increase the efficiency of an oil filter, but they would also be expected to significantly reduce the life of the filter. However, the filter of the present invention has been found to produce significantly improved efficiencies without any substantial reduction in operating life when compared with present commercial oil filters.

To quantify the various characteristics mentioned above, the filter paper used in the spirally wound element 20 preferably has a basis weight of less than about 65 pounds per 3,000 square feet, typically 50 to 65 pounds per 3,000 square feet (as compared with a range of 75–150 pounds per 3,000 square feet for typical oil filter papers used heretofore); a porosity of less than about 20 cubic feet per minute, typically 2.5–15 cubic feet per minute (as compared with a range of 30 to 90 cubic feet per minute for typical oil filter papers used heretofore); and the spirally wound element formed from such paper preferably has a surface area of at least about 700 square inches, typically 750 to 800 square inches (as compared with a range of 350 to 550 square inches for typical pleated paper elements used heretofore). As used herein, the term "porosity" refers to the average air flow in cubic feet per minute per square foot at 0.5 in water per ASTM D737-67 "Test for Air Permeability of Textile Fabrics".

Spirally wound filter elements of the type used in this invention have been previously used in fuel filters, but they have not been used in combination with depth type filtering media in two-stage filters, nor have they been used in automotive oil filters.

To compare the performance of a filter embodying the dual filtering media of this invention with other known filters, both single stage and two stage, the following filters were subjected to a sludge removal test in accordance with SAE J-806A Test Procedure using RFO-3-72 oil (the properties of filters Nos. 1, 2, 3, 7 and 8 were determined by examination and measurement of actual commercial samples, not from manufacturer's specifications):

1. AC PF-2, 5½ inch pleated paper filter, phenolic resin-treated paper, 61 pleats, 527 square inch surface area.

2. Purolator PER-1, 5½ inch pleated paper filter, phenolic resintreated paper, 56 pleats, 387 square inch surface area.

3. Fram PH-8A, 5½ inch pleated paper filter, phenolic resintreated paper, 56 pleats, 374 square inch surface area.

4. Gould P-2150(A), 5½ inch pleated paper filter, phenolic resintreated paper with basis weight of 115 lbs./3,000 sq. ft. and porosity of 42 cu. ft./min., 56 pleats, 398 square inch surface area.

5. Gould P-2150(B), 5½ pleated paper filter, same as No. 4 above except with 53 pleats.

6. Gould P-2150(C), 5½ inch pleated paper filter, phenolic resintreated paper with basis weight of 80 lbs./3,000 sq. ft. and porosity of 90 cu. ft./min., 70 pleats, 504 square inch surface area.

7. Ford Motorcraft FL-1, 5½ inch dual media filter with waste cotton as one stage and rayon fiber (1 inch axial thickness and ⅝ inch radial thickness) as the second stage.

8. Lee (FDI) LF-25 HP, 5½ inch dual media filter with pleated paper as one stage and rayon fiber (1 inch axial thickness and ⅝ inch radial thickness) as the second stage.

9. Two-stage filter of present invention, 5½ inch with the GAF "Donut" (rayon fiber depth type media), 1⅝ inch axial thickness and ⅝ inch radial thickness as one stage. Spirally wound paper with basis weight of 55 lbs./3,000 sq. ft. and porosity of 10 cu. ft./min., 760 square inch surface area, 2½ inch axial thickness and 1 inch radial thickness as second stage.

The results of these tests are illustrated graphically in FIG. 5, which is based on the following actual data:

|  | Efficiency | | | | Life Hours |
| --- | --- | --- | --- | --- | --- |
|  | 10 Hr. | 20 Hr. | End | Avg. |  |
| 1. AC PF-2 | 31.12 | (END-19.56) | 63.04 | 47.08 | 19.56 |
| 2. PURO PER-1 | 23.96 | 25.30 | 48.48 | 32.58 | 29.66 |
| 3. FRAM PH-8A | 24.54 | 26.13 | 46.59 | 32.42 | 28.66 |
| 4. P-2150(A) | 28.77 | 30.13 | 48.49 | 35.79 | 27.47 |
| 5. P-2150(B) | 27.21 | 27.23 | 44.33 | 32.92 | 25.59 |
| 6. P-2150(C) | 19.59 | 23.11 | 46.30 | 29.66 | 25.92 |
| 7. FORD FL-1 | 30.96 | — | 33.86 | 32.41 | 19.00 |
| 8. LEE LF-25HP | 20.89 | 26.15 | 24.82 | 23.95 | 24.00 |
| 9. Invention | 37.93 | 52.90 | 65.26 | 52.03 | 25.43 |

As can be seen from FIG. 5 and the above data, the filter of this invention had an average life (the average of those tested was about 25 hrs.) with a substantially higher efficiency than any of the other filters throughout its entire life, i.e., after the first hour or two. The only efficiency curve that ever crossed the curve for the filter of this invention was the curve for filter No. 1, and that occurred only because filter No. 1 had reached the end of its life. Throughout most of its life, the filter of this invention had an efficiency significantly above that of filter No. 1 (which had by far the shortest life), and even farther above the efficiencies of the other filters.

As can be seen from the foregoing detailed description, the two-stage filter provided by this invention produces significantly improved efficiencies without any substantial reduction in operating life, as compared with present commercial filters. Because of its relatively simple construction and the fact that it uses relatively inexpensive materials, this filter can also be efficiently manufactured at a cost that is competitive with that of most automotive oil filters being manufactured today. Furthermore, this filter can be mass produced at high production rates and can be reliably reproduced.

We claim as our invention:

1. A spin-on filter for the oil lubricating system of an automotive engine, said filter comprising the combination of:

a. a generally cylindrical housing forming fluid inlet and outlet ports in one end thereof, said housing having a screw plate at said one end thereof and forming a threaded central aperture for connecting the filter to the oil lubricating system of an automotive engine, b. a two-stage filter unit mounted within said housing, 1. one stage of said filter unit comprising an annular depth type filtering medium having one surface in fluid communication with said inlet port and another surface exposed to said outlet port so that fluid can flow from said inlet port to said outlet port by flowing through said depth type medium, 2. the other stage of said filter unit comprising at least one spirally wound strip of a surface type filtering medium with alternative pairs of opposed surfaces of the spirally wound medium being continuously bonded to each other along the circumferential edges thereof at one longitudinal end of the spirally wound medium, and with the intervening pairs of opposed surfaces of the spirally wound medium between said alternate pairs of opposed surfaces being continuously bonded to each other along the circumferential edges thereof at the other longitudinal end of the spirally wound medium, so that the spaces between said intervening pairs of opposed surfaces are open at said one longitudinal end of the spirally wound medium and the spaces between said alternate pairs of opposed surfaces are open at said other longitudinal end of the spirally wound medium, 3. said spirally wound medium having one longitudinal end in fluid communication with said inlet port and the other longitudinal end in fluid communication with said outlet port so that fluid can flow from said inlet port to said outlet port by flowing axially through said spirally wound medium.

2. A fluid filter as set forth in claim 1 wherein said spirally wound filtering medium is creped filter paper.

3. A fluid filter as set forth in claim 1 wherein said spirally wound element comprises two coextensive continuous strips of filtering medium having one pair of adjacent surfaces bonded together along one longitudinal edge thereof to form said alternate pairs of bonded surfaces at the first end of the spirally wound element, and having the other pair of adjacent surfaces bonded together along the other longitudinal edge thereof to form said intervening pairs of bonded surfaces at the second end of the spirally wound element.

4. A fluid filter as set forth in claim 1 wherein said spirally would filtering medium is filter paper having a basis weight of less than about 65 pounds per 3,000 square feet.

5. A fluid filter as set forth in claim 1 wherein said spirally wound filtering medium is filter paper having a porosity of less than about 20 cubic feet per minute.

6. A fluid filter as set forth in claim 1 wherein said spirally wound filtering medium is filter paper having a surface area of at least about 700 square inches.

7. A fluid filter as set forth in claim 1 wherein said two-stage filter unit forms an annular fluid passageway between the inner wall of said housing and the outer wall of said filter unit, and said depth type filtering medium has its outer surface exposed to said annular passageway and its inner surface exposed to said outlet port.

8. A fluid filter as set forth in claim 1 wherein said two-stage filter unit forms an annular fluid passageway between the inner wall of said housing and the outer wall of said filter unit, and including a protective barrier around the outer surface of said spirally wound medium to prevent fluid from entering the spirally wound medium in a radial direction; means for conducting fluid from said annular passageway into the longitudinal end of said spirally wound medium that is farther away from said inlet port; and means for conducting fluid from the other longitudinal end of said spirally wound medium to said outlet port.

9. A fluid filter as set forth in claim 8 wherein the spirally wound medium is located farther away from said inlet port than said depth type medium and said spirally wound medium extends inwardly beyond the inner surface of said depth type medium in the radial direction so that fluid is conducted from the spirally wound medium to said outlet port through the hollow core of said annular depth type medium.

10. A fluid filter as set forth in claim 8 wherein said means for conducting fluid from said annular passageway into the longitudinal end of said spirally wound medium comprises an apertured end cap on said longitudinal end of the spirally wound medium.

11. A method of filtering automotive oil in the oil lubricating system of an automotive engine, said method comprising passing the oil from the oil lubricating system of the engine in parallel through two filtering elements, a. the first element comprising a depth type filtering medium, and
b. the second element comprising at least one spirally wound strip of a surface type filtering medium with alternate pairs of opposed surfaces of the spirally wound medium being continuously bonded to each other along the circumferential edges thereof at one longitudinal end of the spirally wound medium, and with the intervening pairs of opposed surfaces of the spirally wound medium between said alternate pairs of opposed surfaces being continuously bonded to each other along the circumferential edges thereof at the other longitudinal end of the spirally wound medium so that the spaces between said intervening pairs of opposed surfaces are open at said one longitudinal end of the spirally wound medium and the spaces between said alternate pairs of opposed surfaces are open at said other longitudinal end of the spirally wound medium, said oil being passed through said spirally wound element in the direction of the axis of the spiral.

12. The method of claim 11 wherein said spirally wound filtering medium is creped filter paper.

13. The method of claim 11 wherein said spirally wound filtering medium is filter paper having a basis weight of less than about 65 pounds per 3,000 square feet, a porosity of less than about 20 cubic feet per minute, and a surface area of at least about 700 square inches.

14. The method of claim 11 wherein the oil is passed radially through the depth type filtering medium.

* * * * *